US008097383B2

(12) United States Patent
Kaneko et al.

(10) Patent No.: US 8,097,383 B2
(45) Date of Patent: *Jan. 17, 2012

(54) ELECTROLYTE MATERIAL FOR POLYMER ELECTROLYTE FUEL CELLS, ELECTROLYTE MEMBRANE AND MEMBRANE/ELECTRODE ASSEMBLY

(75) Inventors: Isamu Kaneko, Chiyoda-ku (JP); Tetsuji Shimohira, Chiyoda-ku (JP); Atsushi Watakabe, Chiyoda-ku (JP); Seigo Kotera, Chiyoda-ku (JP); Satoru Hommura, Chiyoda-ku (JP); Koichi Murata, Chiyoda-ku (JP); Jyunichi Tayanagi, Chiyoda-ku (JP); Susumu Saito, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 377 days.

This patent is subject to a terminal disclaimer.

(21) Appl. No.: 12/010,589

(22) Filed: Jan. 28, 2008

(65) Prior Publication Data

US 2008/0138685 A1 Jun. 12, 2008

Related U.S. Application Data

(63) Continuation of application No. PCT/JP2006/314813, filed on Jul. 26, 2006.

(30) Foreign Application Priority Data

Jul. 27, 2005 (JP) .................................. 2005/217110
Aug. 9, 2005 (JP) .................................. 2005/230826
Jan. 6, 2006 (JP) .................................. 2006/001500

(51) Int. Cl.
H01M 8/10 (2006.01)

(52) U.S. Cl. .......................... 429/492; 429/493; 429/494

(58) Field of Classification Search ..................... 429/33
See application file for complete search history.

(56) References Cited

U.S. PATENT DOCUMENTS 5,463,005 A 10/1995 Desmarteau
(Continued)

FOREIGN PATENT DOCUMENTS

EP 1447816 8/2004
(Continued)

OTHER PUBLICATIONS

U.S. Appl. No. 12/019,355, filed Jan. 24, 2008, Shimohira, et al.
(Continued)

*Primary Examiner* — Barbara Gilliam
*Assistant Examiner* — Stephan Essex
(74) *Attorney, Agent, or Firm* — Oblon, Spivak, McClelland, Maier & Neustadt, L.L.P.

(57) ABSTRACT

To provide a polymer electrolyte material for polymer electrolyte fuel cells, which is an electrolyte material having a high ion exchange capacity and a low resistance, and which has a higher softening temperature than a conventional electrolyte material.

An electrolyte material for polymer electrolyte fuel cells, which is made of a polymer containing repeating units based on a fluoromonomer having a radical polymerization reactivity, wherein the repeating units contain, in their side chains, a structure having ionic groups represented in the following formula (α) (provided that in the formula, each of $Q^1$ and $Q^2$ which are independent of each other, is a single bond or a perfluoroalkylene group that may have an etheric oxygen atom, provided that they are not single bonds at the same time, $R^{f1}$ is a perfluoroalkyl group which may have an etheric oxygen atom, and X is an oxygen atom, a nitrogen atom or a carbon atom, provided that when X is an oxygen atom, a=0, when X is a nitrogen atom, a=1, and when X is a carbon atom, a=2, and Y is a fluorine atom or a monovalent perfluoro organic group).

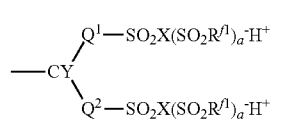

(α)

19 Claims, 1 Drawing Sheet

U.S. PATENT DOCUMENTS

| | | | |
|---|---|---|---|
| 2002/0064700 A1 * | 5/2002 | Higuchi et al. | 429/33 |
| 2004/0265676 A1 | 12/2004 | Takagi et al. | |
| 2005/0266291 A1 * | 12/2005 | Watakabe | 429/33 |
| 2006/0106252 A1 * | 5/2006 | Murata et al. | 562/825 |

FOREIGN PATENT DOCUMENTS

| | | |
|---|---|---|
| EP | 1 583 106 A1 | 10/2005 |
| EP | 1640362 | 3/2006 |
| JP | 2004-107313 | 4/2004 |
| JP | 2004-164854 | 6/2004 |
| WO | 03/036655 | 5/2003 |
| WO | 03/106515 | 12/2003 |
| WO | WO 03/106515 A1 | 12/2003 |
| WO | WO 2004/097851 A1 | 11/2004 |
| WO | WO 2004097851 A1 * | 11/2004 |
| WO | 2005/003062 | 1/2005 |
| WO | 2005/003062 A2 | 1/2005 |
| WO | WO 2005003062 A2 * | 1/2005 |

OTHER PUBLICATIONS

U.S. Appl. No. 12/483,315, filed Jun. 12, 2009, Kotera, et al.
U.S. Appl. No. 12/533,667, filed Jul. 31, 2009, Hommura, et al.
U.S. Appl. No. 12/535,709, filed Aug. 5, 2009, Watakabe.
U.S. Appl. No. 11/771,332, filed Jun. 29, 2007, Shimohira, et al.
U.S. Appl. No. 12/021,842, filed Jan. 29, 2008, Yamada, et al.

* cited by examiner

ELECTROLYTE MATERIAL FOR POLYMER ELECTROLYTE FUEL CELLS, ELECTROLYTE MEMBRANE AND MEMBRANE/ELECTRODE ASSEMBLY

TECHNICAL FIELD

The present invention relates to an electrolyte material constituting an electrolyte membrane or an electrolyte material contained in a catalyst layer for polymer electrolyte fuel cells, and an electrolyte membrane for polymer electrolyte fuel cells and a membrane/electrode assembly for polymer electrolyte fuel cells using the electrolyte material.

BACKGROUND ART

Heretofore, a polymer having fluorosulfonyl groups ($—SO_2F$) in a copolymer of a fluorinated monomer of the following formula with tetrafluoroethylene, converted to sulfonic acid groups ($—SO_3H$), has been commonly used as an electrolyte material constituting an ion change membrane (such as a membrane to be used for electrolysis of sodium chloride or for a polymer electrolyte fuel cell) or a catalyst layer for a fuel cell. In the following formula, $Y^1$ represents a fluorine atom or a trifluoromethyl group, n is an integer of from 1 to 12, m is an integer of from 0 to 3 and p is 0 or 1, provided that m+p>0.

$$CF_2=CF—(OCF_2CFY^1)_m—O_p—(CF_2)_n—SO_2F$$

In a case where a sulfonic acid group-containing polymer (hereinafter referred to also as sulfonic acid polymer) is used for a fuel cell, it is a polymer capable of improving the power generation energy efficiency, but for further improvement of the performance, a polymer having a lower electric resistance and a high softening temperature is desired for a sulfonic acid polymer. The electric resistance may be lowered by increasing the proportion of the fluorosulfonyl group-containing monomer and increasing the ion exchange capacity of the sulfonic acid polymer. However, with the conventional fluorosulfonyl group-containing monomer, it was difficult to sufficiently increase the molecular weight of a copolymer when it was attempted to increase the proportion of the fluorosulfonyl group-containing monomer used for copolymerization, and there was a problem that the copolymer became swollen too much by water. Therefore, a membrane formed from this kind of copolymer did not have sufficient mechanical strength or durability so that it was not practical for use.

Under the circumstances, to obtain a membrane having a high tetrafluoroethylene content in order to maintain a high ion exchange capacity and secure the strength, it is conceivable to use a monomer having a plurality of sulfonic acid groups or precursor groups capable of being converted to sulfonic acid groups, such as fluorosulfonyl groups, in its molecule.

As such a monomer, the following compound which is a monomer having two fluorosulfonyl groups, is disclosed in Patent Document 1:

$$[FSO_2(CF_2)_a][FSO_2(CF_2)_b]CF-Q^F-CF_2OCF=CF_2$$

In the formula disclosed in Patent Document 1, a is an integer of from 1 to 3, b is an integer of from 1 to 3, and $Q^F$ is a single bond or a $C_{1-6}$ perfluoroalkylene group which may have an etheric oxygen atom. However, it does not disclose a polymer obtained by polymerization of such a monomer or an electrolyte material for fuel cells.

Further, in Patent Document 2, a sulfonic acid polymer obtained by the following monomer is proposed.

$$(XSO_2)_kCY^1(CF_2)_mO(CFZCF_2O)_nCF=CF_2$$

In the formula disclosed in Patent Document 2, k=2 or 3, k+1=3, m=0 to 5, n=0 to 5, X=F, Cl, OH, $O(M)_{1/L}$ (wherein M is a monovalent to trivalent metal, and L is the valence of the metal), OR (wherein R is a $C_{1-5}$ alkyl group, and such an alkyl group may be one containing an element other than carbon or hydrogen), or $A-(SO_2Rf)_aB$ (wherein A is nitrogen or carbon, as to a, a=1 when A is nitrogen and a=2 when A is carbon, B is hydrogen or a monovalent metal, and Rf is a perfluorinated alkyl group), $Y^1$=F, Cl or $CF_3$, and Z=F, Cl, $CF_3$, Br or I.

The sulfonic acid polymer has a structure wherein a plurality of sulfonic acid groups are bonded to one carbon atom, and there is concern about stability, as there is no certainty as to whether or not such a structure may have durability over a long period of time.

Patent Document 1: WO2005/003062 (claim 17)
Patent Document 2: WO03/106515 (within the Claim)

DISCLOSURE OF THE INVENTION

Object to be Accomplished by the Invention

An object of the present invention is to provide an electrolyte material for polymer electrolyte fuel cells, which is an electrolyte material having a high ion exchange capacity and a low resistance, and having a higher softening temperature than a conventional electrolyte material, and which shows an excellent performance and durability even under a high temperature and low humidity environment.

Means to Accomplish the Object

The present invention provides an electrolyte material for polymer electrolyte fuel cells, which is made of a polymer containing repeating units based on a fluoromonomer having a radical polymerization reactivity, wherein the repeating units contain, in their side chains, a structure of the following formula (α) having ionic groups (wherein the symbols in the formula have the following meanings: each of $Q^1$ and $Q^2$ which are independent of each other, is a single bond or a perfluoroalkylene group which may have an etheric oxygen atom, provided that they are not single bonds at the same time; $R^{f1}$ is a perfluoroalkyl group which may have an etheric oxygen atom, and X is an oxygen atom, a nitrogen atom or a carbon atom, provided that when X is an oxygen atom, a=0, when X is a nitrogen atom, a=1, and when X is a carbon atom, a=2; and Y is a fluorine atom or a monovalent organic perfluoro group).

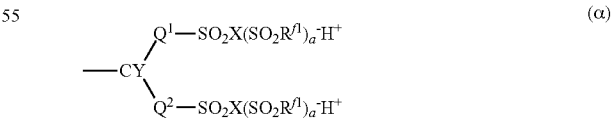

(α)

The above ionic groups are strong acid groups, for example, such as sulfonic acid groups, and they are suitable as ionic groups of an electrolyte material for a fuel cell.

The present invention further provides a process for producing an electrolyte material for a polymer fuel cell, which is a process for producing the above electrolyte material, which comprises radically polymerizing a fluorinated monomer having a carbon-carbon double bond and a structure of the following formula (β) having fluorosulfonyl groups (wherein the symbols in the formula have the following meanings: each of $Q^1$ and $Q^2$ which are independent of each other, is a single bond or a perfluoroalkylene group which may have an etheric oxygen atom, provided that they are not single bonds at the same time; and Y is a fluorine atom or a monovalent perfluoro organic group) in the presence of a radical initiator, and then converting the fluorosulfonyl groups to ionic groups of the formula $-(SO_2X(SO_2R^{f1})_a)^-H^+$ (wherein $R^{f1}$ is a perfluoroalkyl group which may have an etheric oxygen atom, and X is an oxygen atom, a nitrogen atom or a carbon atom, provided that when X is an oxygen atom, a=0, when X is a nitrogen atom, a=1, and when X is a carbon atom, a=2).

(β)

Further, the present invention provides a membrane/electrode assembly for polymer electrolyte fuel cells, which comprises a cathode and an anode each having a catalyst layer containing a catalyst and a polymer electrolyte, and a polymer electrolyte membrane interposed between the cathode and the anode, wherein the polymer electrolyte membrane is formed from the above mentioned electrolyte material.

Moreover, the present invention provides a membrane/electrode assembly for polymer electrolyte fuel cells, which comprises a cathode and an anode each having a catalyst layer containing a catalyst and a polymer electrolyte, and a polymer electrolyte membrane interposed between the cathode and the anode, wherein the polymer electrolyte contained in at least one of the catalyst layers of the cathode and the anode, is the above mentioned electrolyte material.

Effects of the Invention

According to the present invention, it is possible to provide an electrolyte material for polymer electrolyte fuel cells, having a high ion exchange capacity resulting in a low electric resistance, and having a high softening temperature, excellent mechanical strength, and durability. When the softening temperature of the electrolyte material becomes high, it will be possible to operate the cell at a higher temperature than before, which will be able to contribute to a high output or improvement of cooling efficiency of the fuel cell. Further, when the electric resistance of the electrolyte material becomes low, it will be possible to exhibit a high performance of the electric power generation even under a low humidity environment, which will be able to contribute to simplification of the humidifying system.

BEST MODE FOR CARRYING OUT THE INVENTION

Figure 1:
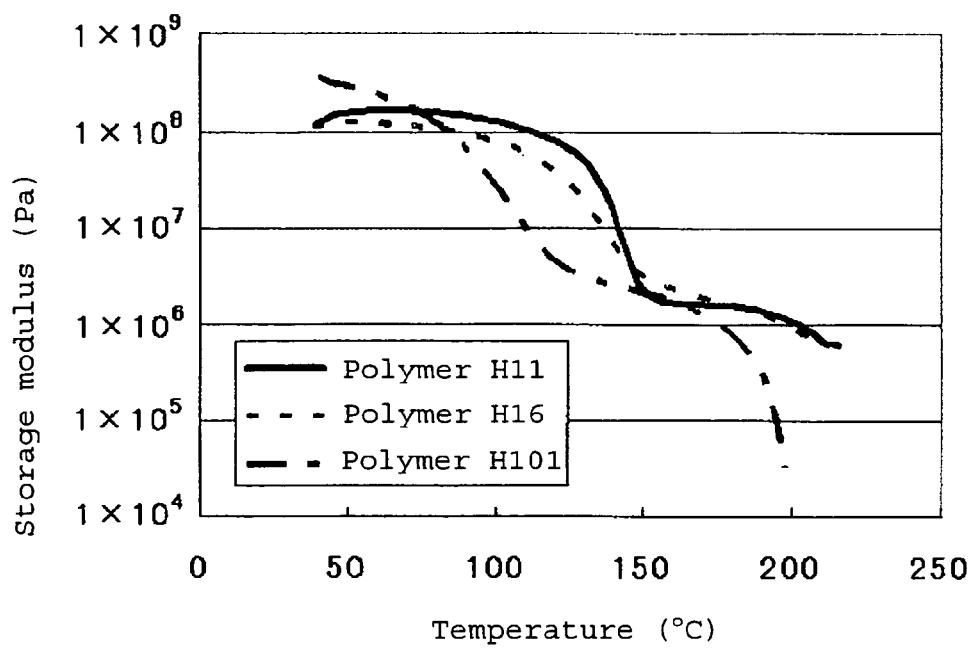
FIG. 1 is a graph showing a relation between the storage modulus and the temperature with respect to polymers of the present invention.

In this specification, a compound of the formula (u1) will be represented by the compound (u1). The repeating units having a structure of the formula (α) contained in a polymer will be represented by the units (α). The polymer containing the units (α) will be represented by the polymer (α). The compounds, units, and polymers represented by other formulae will be represented in the same manner. The repeating units in this specification are atomic groups a number of which are present in the polymer. The repeating units are meant for units derived from a monomer, which are formed by polymerization of such a monomer. They may be units (namely, monomer units) formed directly by a polymerization reaction, or units obtained by conversion of monomer units to a new structure by chemical modification of the polymer.

In this specification, an organic group is meant for a group containing at least one carbon atom.

The polymer (hereinafter referred to also simply as the present polymer) constituting the electrolyte material for polymer electrolyte fuel cells in the present invention (hereinafter referred to as the present electrolyte material) has repeating units having, in their side chains, a structure of the following formula (α) having ionic groups ($Q^1$, $Q^2$, $R^{f1}$ and Y are as defined above, the same applies hereinafter). Here, $Q^1$ or $Q^2$ being a single bond means that $Q^1$ or $Q^2$ is directly bonded to the carbon atom of the CY group (the same applies hereinafter). Further, by the above definition, at least one of $Q^1$ and $Q^2$ is a perfluoroalkylene group which may have an etheric oxygen atom.

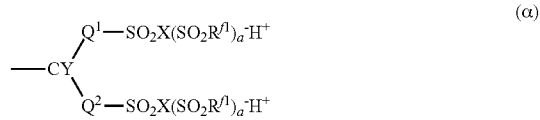

(α)

When each of the above $Q^1$ and $Q^2$ is a perfluoroalkylene group which may have an etheric oxygen atom, the number of etheric oxygen atoms in the perfluoroalkylene group may be one or more. Further, such an etheric oxygen atom may be inserted in the carbon atom-carbon atom bond of the perfluoroalkylene group, or may be inserted at one or both terminals of the perfluoroalkylene group. The perfluoroalkylene group may be linear or branched, and is preferably linear. The number of carbon atoms in the perfluoroalkylene group is preferably from 1 to 6, more preferably from 1 to 4. If the number of carbon atoms is too large, the boiling point of the monomer to be used for polymerization tends to be high, whereby purification by distillation tends to be difficult. Further, if the number of carbon atoms is too large, the ion exchange capacity of the present electrolyte material tends to decrease, thus increasing the resistance.

It is preferred that each of $Q^1$ and $Q^2$ which are independent of each other, is a $C_{1-6}$ perfluoroalkylene group which may have an etheric oxygen atom because excellent stability is obtainable in the operation for a long period of time as compared with a case when either $Q^1$ or $Q^2$ is a single bond.

Further, at least one of $Q^1$ and $Q^2$ is preferably a $C_{1-6}$ perfluoroalkylene group having an etheric oxygen atom. It is thereby possible to prepare the monomer without a fluorination reaction with a fluorine gas, and accordingly its production is easy with high yield.

The ionic group of $-(SO_2X(SO_2R^{f1})_a)^-H^+$ may be a sulfonic acid group ($-SO_3^-H^+$ group), a sulfonimide group ($-SO_2NSO_2R^{f1})^-H^+$, or a sulfonmethide group ($-SO_2C(SO_2R^{f1})_2)^-H^+$. When $R^{f1}$ is a perfluoroalkyl group, it may be linear or branched, and is preferably linear. The number of carbon atoms in $R^{f1}$ is preferably from 1 to 6, more preferably from 1 to 4. Specifically, a perfluoromethyl group or a perfluoroethyl group is, for example, preferred. In the sulfonmethide group, the two $R^{f1}$ may be the same or different.

The above Y is preferably a fluorine atom or a $C_{1-6}$ linear perfluoroalky group which may have an etheric oxygen atom.

The above repeating units having, in their side chains, a structure of the formula ($\alpha$) having ionic groups are preferably the following units (U1) (wherein n is 0 or 1).

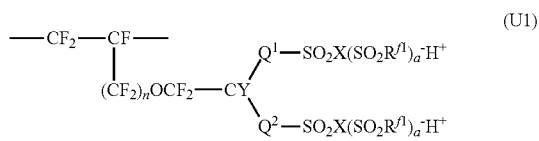

Moreover, the repeating units having, in their side chains, a structure of the formula ($\alpha$) having ionic groups are preferably the following units (M1) (wherein the symbols in the formula have the following meanings: $R^{F11}$ is a single bond or a $C_{1-6}$ linear perfluoroalkylene group which may have an etheric oxygen atom, and $R^{F12}$ is a $C_{1-6}$ linear perfluoroalkylene group). Particularly, the following units (M11), (M12) or (M13) are preferred, from the viewpoint of easiness of the polymer production and industrial practice.

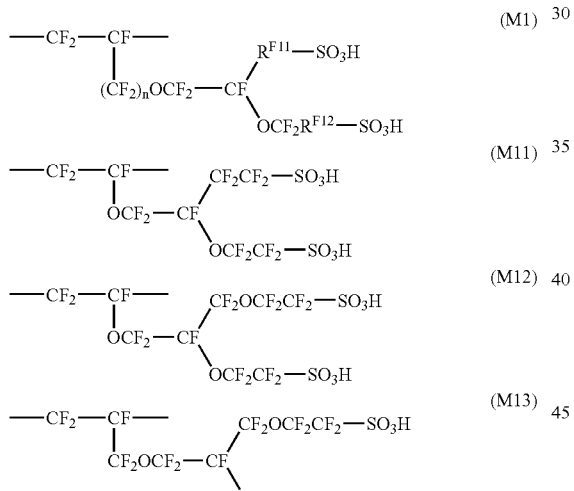

For the production of the present polymer, a fluorinated monomer having a structure of the formula ($\beta$) having fluorosulfonyl groups and a carbon-carbon double bond (hereinafter referred to as a fluorinated monomer ($\beta$)) is radically polymerized in a presence of a radical initiator.

The above fluorinated monomer ($\beta$) is preferably the following compound (u1), more preferably the following compound (m1). Particularly, the following compound (m11), (m12) or (m13) is preferable.

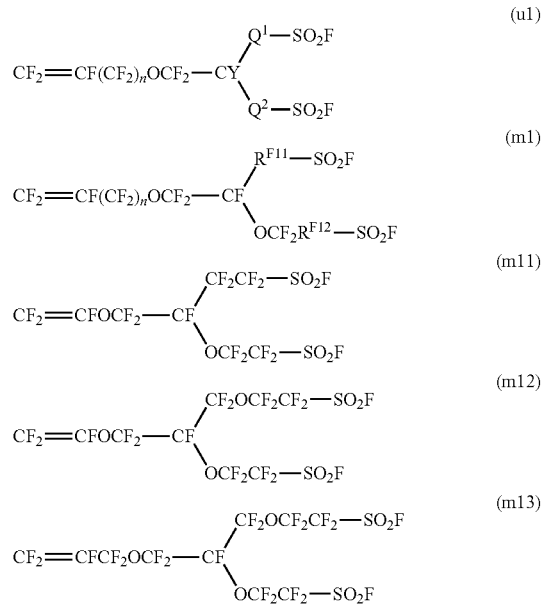

The present polymer may be a polymer comprising at least one type of units ($\alpha$) or a polymer comprising at least one type of units ($\alpha$) and at least one type of units (hereinafter referred to as other units) other than the units ($\alpha$). The latter polymer is preferably a polymer comprising one type of units ($\alpha$) and at least one type of other units. The polymer being a polymer having other units, is preferably one prepared by a method of copolymerizing a fluorinated monomer having a structure of the formula ($\alpha$) with at least one type of copolymerizable other monomers.

As such other monomers, nonionic monomers are usually selected. Here, non-ionic means that the monomers have no ionic groups or precursor groups thereof. Examples of such other monomers include tetrafluoroethylene, chlorotrifluoroethylene, trifluoroethylene, vinylidene fluoride, vinyl fluoride and ethylene. Examples of a monomer having a cyclic structure among other monomers include perfluoro(2,2-dimethyl-1,3-dioxole), perfluoro(1,3-dioxole), perfluoro(2-methylene-4-methyl-1,3-dioxolane) and perfluoro(4-methoxy-1,3-dioxole). Examples of a cyclopolymerizable monomer among other monomers include perfluoro(3-butenyl vinyl ether), perfluoro(allyl vinyl ether) and perfluoro(3,5-dioxa-1,6-heptadiene). Further, the following monomers (wherein p is an integer of from 2 to 6) may also be suitably used.

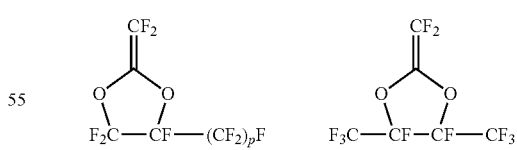

Among the above-mentioned other monomers, tetrafluoroethylene is preferred, since its copolymer will not only be excellent in chemical stability and heat resistance but also have a high mechanical strength, and the softening temperature of the copolymer will also be higher than a conventional sulfonic acid polymer.

Further, as a monomer which is further copolymerizable together with the above exemplified other monomers, propene, a perfluoro $\alpha$-olefin such as hexafluoropropene, a (perfluoroalkyl)ethylene such as (perfluorobutyl)ethylene, a (perfluoroalkyl)propene such as 3-perfluorooctyl-1-propene, or a perfluorovinyl ether such as a perfluoro(alkyl vinyl ether) or a perfluoro(etheric oxygen atom-containing alkyl vinyl ether) may be used.

The perfluoro vinyl ether is preferably a compound represented by $CF_2=CF-(OCF_2CFZ)_t-O-R^f$, wherein t is an integer of from 0 to 3, Z is a fluorine atom or a trifluoromethyl group, and $R^f$ is a $C_{1-12}$ perfluoroalkyl group which may have a linear structure or a branched structure. Particularly preferred are the following compounds (i) to (iii). In the formulae, v is an integer of from 1 to 9, w is an integer of from 1 to 9, and x is 2 or 3.

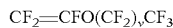   (i)

   (ii)

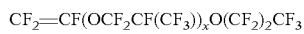   (iii)

In order to obtain a polymer capable of forming an electrolyte material for a polymer electrolyte fuel cell excellent in chemical stability with high durability, the present polymer is preferably a perfluoropolymer, and as the above other monomer, it is preferred to select a perfluorocompound.

It is effective to introduce a cyclic structure into a polymer in order to obtain a polymer to be used as a polymer electrolyte for a catalyst layer or as a polymer electrolyte membrane, each of which has a still higher softening temperature as compared with a polymer having units having the structure of the formula (α) and units of tetrafluoroethylene. Further, it is possible to increase the cell output by using a polymer having the cyclic structure introduced to have high oxygen solubility or oxygen permeability as the polymer electrolyte for a cathode catalyst layer. In order to obtain such a polymer, it is preferred to select, as other monomers, the above-mentioned monomers containing a cyclic structure or cyclopolymerizable monomers. Among them, perfluoro(2,2-dimethyl-1,3-dioxole) is preferred.

In a case where other units are contained in the present polymer, the proportion of such other units is selected so that the ion exchange capacity will be in the after-mentioned range. In a case where the polymer is used for an electrolyte membrane of a fuel cell, such other units are preferably tetrafluoroethylene units as mentioned above, but in order to control the softening temperature or the processability, other units may be contained as a third component. The third component is preferably units based on a monomer having a cyclic structure or a cyclopolymerizable monomer. In order to maintain the membrane strength, the tetrafluoroethylene units are preferably contained in an amount of at least 20 mo %, more preferably at least 40 mol %. Also in a case where the polymer of the present invention is used for a catalyst layer for a fuel cell, a polymer having the same composition as for the membrane may be employed. The third component is preferably units based on a monomer having a cyclic structure or a cyclopolymerizable monomer. Further, it is possible to use a polymer containing, as other units, units based on a monomer having a cyclic structure or a cyclopolymerizable monomer and not containing tetrafluoroethylene units. However, in order to obtain a constant performance over a long period of time, it is preferred to employ a polymer containing at least 20 mol %, more preferably at least 40 mol %, of tetrafluoroethylene units.

The ion exchange capacity (hereinafter referred to as $A_R$) of the present electrolyte material is preferably from 0.5 to 2.5 meq/g dry polymer (hereinafter referred to as meq/g). If $A_R$ of the electrolyte material is too small, the water content of the electrolyte material tends to be low, and the ion conductivity tends to be low. Accordingly, when the electrolyte material is used as a material constituting an electrolyte membrane or a catalyst layer for a polymer electrolyte fuel cell, it tends to be difficult to obtain sufficient cell output. On the other hand, if $A_R$ of the electrolyte material is too large, preparation of the polymer having a high molecular weight is not easy, and the polymer tends to be excessively swelled with water, whereby it tends to be difficult to maintain the strength.

From the above view points, $A_R$ of the present electrolyte material is preferably from 0.9 to 2.3 meq/g, more preferably from 1.3 to 2.0 meq/g, and particularly preferably from 1.4 to 1.9 meq/g. As the commonly used electrolyte material made of a copolymer with a tetrafluoroethylene, which has one ionic group in each side chain, one having $A_R$ of from 0.9 to 1.1 meq/g is used for the balance of the resistance and the strength. However, the electrolyte material made of a polymer having two ionic groups in each side chain, like the one of the present invention, can maintain the mechanical strength even if the ion exchange capacity is made to be larger to make the resistance lower than a conventional membrane.

The weight-average molecular weight of the present polymer is preferably from $1\times10^4$ to $1\times10^7$, particularly preferably from $5\times10^4$ to $5\times10^6$, further preferably from $1\times10^5$ to $3\times10^6$. If the molecular weight of the polymer is too small, the physical properties such as the swelling degree are likely to change with time, whereby the durability is likely to be inadequate. On the other hand, if the molecular weight is too large, solubilization or molding is likely to be difficult.

The polymerization reaction of the present polymer is not particularly limited as long as it is carried out under the condition for formation of radicals. For example, the reaction may be carried out by bulk polymerization, solution polymerization, suspension polymerization, emulsion polymerization, or polymerization in a liquid or in the supercritical carbon dioxide.

The method of forming radicals is not particularly limited. For example, it is possible to use a method of irradiation with radiation rays such as ultraviolet rays, γ rays or electron rays, and it is also possible to use a method of using a radical initiator used for usual radical polymerization. The reaction temperature for a polymerization reaction is not limited, and it is usually from 10 to 150° C.

When the radical initiator is used, the radical initiator may, for example, be a bis(fluoroacyl) peroxide, a bis(chlorofluoroacyl) peroxide, a dialkyl peroxydicarbonate, a diacyl peroxide, a peroxyester, a dialkyl peroxide, a bis(fluoroalkyl) peroxide, an azo compound or a persulfate.

When solution polymerization is carried out, from the viewpoint of handling, the solvent to be used usually has a boiling point of preferably from 20 to 350° C., more preferably from 40 to 150° C. Further, a prescribed amount of at least one of the above monomers is put in the solvent, and a radical initiator, etc. are added thereto to form radicals, and then polymerization is carried out. A gas monomer and/or a liquid monomer may be added at once, sequentially or continuously.

Here, a useful solvent may, for example, be a perfluorotrialkylamine such as perfluorotributylamine, a perfluorocarbon such as a perfluorohexane or perfluorooctane, a hydrofluorocarbon such as 1H,4H-perfluorobutane or 1H-perfluorohexane, or a hydrochlorofluorocarbon such as 3,3-dichloro-1,1,1,2,2-pentafluoropropane or 1,3-dichloro-1,1,2,2,3-pentafluoropropane.

Suspension polymerization may be carried out by using water as a dispersion medium, adding a monomer to be polymerized, and using, as a radical initiator, a nonionic initiator such as a bis(fluoroacyl) peroxide, a bis(chlorofluoroacyl) peroxide, a dialkyl peroxydicarbonate, a diacyl peroxide, a peroxyester, a dialkyl peroxide, a bis(fluoroalkyl) peroxide or an azo compound. The solvent mentioned in the solution polymerization section may be added as an auxiliary agent. Further, to prevent aggregation of suspended particles, a proper surfactant may be added as a dispersion stabilizer. To adjust the molecular weight, a hydrocarbon compound such as hexane or methanol may be added.

It is possible to produce the compound (m1) used for the polymerization reaction for the present polymer by the synthetic reactions shown by the following scheme.

described above, and then carrying out a dechlorination reaction or a debromination reaction using zinc metal.

Further, to improve the durability, after polymerization, the present polymer may be fluorinated with a fluorine gas or treated with heat in the presence of air and/or water in order to stabilize the unstable portions such as the polymer ends.

The present electrolyte material made of the present polymer may be used as a polymer electrolyte membrane after being formed into a membrane form. The forming method into a membrane form is not limited, so the membrane may be formed by casting a liquid obtained by dissolving or dispersing the polymer electrolyte material in a solvent, or it may be

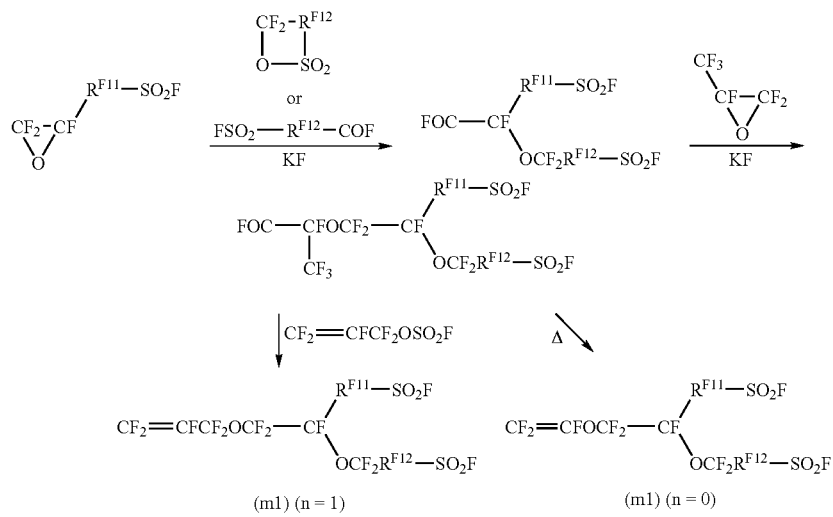

Further, the monomer used for the polymerization reaction of the present polymer may be produced in the same method as described in Example 4 of WO2005/003062.

The present electrolyte material having sulfonic acid groups (—SO$_3$⁻H⁺ groups) as ionic groups, may be obtained by polymerizing the fluorinated monomer having fluorosulfonyl groups (—SO$_2$F groups) by the above-described process, then carrying out the alkali hydrolysis and treatment for conversion to an acid form.

The present electrolyte material having sulfonimide groups (—SO$_2$NSO$_2$R$^{f1}$)⁻H⁺ (wherein R$^{f1}$ is as defined above) as ionic groups, may be obtained by copolymerizing a monomer having the corresponding —SO$_2$F groups in a fluorinated monomer converted to sulfonimide groups, or preparing a polymer having the corresponding —SO$_2$F groups and converting the —SO$_2$F groups of the polymer to sulfonimide groups. The —SO$_2$F groups may be converted to a salt form of sulfonimide groups (—SO$_2$NMSO$_2$R$^{f1}$ groups) by a reaction with R$^{f1}$SO$_2$NHM (wherein M is an alkali metal or a primary to quaternary ammonium), a reaction with R$^{f1}$SO$_2$NH$_2$ in the presence of an alkali metal hydroxide, an alkali metal carbonate, MF (wherein M is the same as mentioned above), ammonia or a primary to tertiary amine, or a reaction with R$^{f1}$SO$_2$NMSi(CH$_3$)$_3$ (wherein M is as defined above). Further, it is possible to carry out the conversion to an acid form by treatment with an acid such as sulfuric acid, nitric acid or hydrochloric acid.

The conversion of the fluorinated monomer having the —SO$_2$F groups to the monomer having the sulfonimide groups, is carried out by adding chlorine or bromine to the unsaturated bond of the monomer, and converting the —SO$_2$F groups to sulfonimide groups by the same method as obtained via an operation of e.g. extrusion or stretching. For the extrusion, from the viewpoint of excellent flowability, a polymer having —SO$_2$F groups which is a precursor of the polymer electrolyte material, is preferably used. After the extrusion, it is converted to a polymer electrolyte membrane by hydrolysis.

Further, the polymer electrolyte membrane may be reinforced with a porous material, fiber, woven cloth or unwoven cloth made of e.g. polytetrafluoroethylene (PTFE), a tetrafluoroethylene-hexafluoropropylene copolymer (FEP), a tetrafluoroethylene-perfluoro(alkoxy vinyl ether) copolymer (PFA), polyethylene, polypropylene or polyphenylenesulfide. The polymer or the membrane having ionic groups obtained by such a method, may be treated with an aqueous hydrogen peroxide solution as the case requires.

Further, as a method for further improving the durability of the electrolyte membrane, it is also preferred to add at least one type of atoms selected from the group consisting of cerium and manganese to the electrolyte membrane. Cerium or manganese is considered to have a function to decompose hydrogen peroxide which is a substance to cause deterioration of the electrolyte membrane. Cerium or manganese is particularly preferably present in the form of ions in the membrane, and as long as it is present in the form of ions, it may be present in any state in the electrolyte membrane. In one method, some of sulfonic acid groups in a cation exchange membrane may be present as ion-exchanged with cerium ions or manganese ions. In the electrolyte membrane, cerium ions or manganese ions may not be uniformly contained, and they may be varied in the thickness direction or in-plane.

Further, cerium or manganese will improve the durability of the electrolyte membrane even if it is present in the membrane in a state of particles of its oxide or phosphate.

Further, cerium atoms or manganese atoms are effective to improve the durability of the polymer electrolyte fuel cell even if they are contained in the catalyst layers.

Further, to the electrolyte membrane of the present invention, silica or zirconium phosphate or a heteropolyacid such as phosphorus molybdic acid or phosphorus tungstic acid may be incorporated as a water retention agent to prevent drying up.

In a case where the present electrolyte material is cast-formed into an electrolyte membrane or it is contained uniformly in a catalyst layer, it is necessary to use a solution or dispersion of the present electrolyte material. The present electrolyte material may be easily dissolved or dispersed in an organic solvent having a hydroxyl group. The organic solvent having a hydroxyl group is not particularly limited, but an organic solvent having an alcoholic hydroxyl group is preferred.

The organic solvent having an alcoholic hydroxyl group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol. Further, as an organic solvent other than an alcohol, an organic solvent having a carboxyl group such as acetic acid may also be used.

Here, as the organic solvent having a hydroxyl group, the above-mentioned solvent may be used alone, or two or more of such solvents may be used as mixed. Further, it may be used in combination with water or another fluorinated solvent. As such another fluorinated solvent, for example, fluorinated solvents exemplified as preferred fluorinated solvents in the above-described solution polymerization reaction in the production of a polymer electrolyte material, may be mentioned. In a case where the organic solvent having a hydroxyl group is to be used as a solvent mixture with water or another fluorinated solvent, the content of the organic solvent having a hydroxyl group is preferably at least 10%, more preferably at least 20%, based on the total mass of the solvents.

Further, in such a case, the present electrolyte material may be dissolved or dispersed in the solvent mixture from the beginning. However, the present electrolyte material may also be dissolved or dispersed in an organic solvent having a hydroxyl group at first, and then water or another fluorinated solvent may be mixed thereto. Further, dissolution or dispersion of the present electrolyte material in such a solvent is preferably carried out within a temperature range of from 0 to 250° C., more preferably from 20 to 150° C., under the atmospheric pressure or under a condition closed and pressurized by e.g. an autoclave. Further, for dissolution and dispersion, shearing force by e.g. ultrasonic waves may be applied as the case requires. In a case where an organic solvent having a boiling point lower than water is incorporated, water may be added after or during distilling off the solvent to substitute water for the solvent.

A liquid composition obtained by using such a solvent is useful for preparing a cast membrane made of the polymer electrolyte material or for preparing catalyst layers for a polymer electrolyte fuel cell. In the case of preparing catalyst layers, a liquid obtained by mixing a catalyst to the liquid composition may be coated. In such a case, the content of the polymer electrolyte material in the liquid composition is preferably from 1 to 50%, more preferably from 3 to 30%, based on the total mass of the liquid composition. If it is less than 1%, it will be necessary to increase the number of coating operations in order to obtain a desired thickness in the preparation of the membrane or catalyst layers, or the time for removal of the solvent will be prolonged, thus it tends to be difficult to conduct the production operation efficiently. On the other hand, if it exceeds 50%, the viscosity of the liquid composition tends to be too high, and the handling efficiency tends to be poor.

Such a liquid composition may be prepared even when the counter ions of the present electrolyte material are substituted by monovalent metal cations other than $H^+$ or by ammonium ions wherein at least one hydrogen atom may be substituted by a hydrocarbon group. In such a case, after forming the electrolyte membrane or catalyst layers, the counter ions may be converted to $H^+$ by treatment with an acid such as hydrochloric acid, nitric acid or sulfuric acid. The monovalent metal cations may, for example, be $Li^+$, $Na^+$ or $K^+$, and the ammonium ions may, for example, be trimethyl ammonium ions, triethyl ammonium ions, tributyl ammonium ions, or tetramethyl ammonium ions.

The present electrolyte material is a material to constitute a membrane/electrode assembly for a polymer electrolyte fuel cell, and the membrane/electrode assembly comprises a cathode and an anode each having a catalyst layer containing a catalyst and a polymer electrolyte, and a polymer electrolyte membrane interposed between the cathode and the anode. The anode or the cathode usually contains a gas diffusion layer made of e.g. a carbon paper or a carbon cloth on the side not in contact with the electrolyte membrane of the catalyst layer. The gas diffusion layer has a function as a current collector and a function to diffuse gas more uniformly into the layer containing the catalyst. Such a membrane/electrode assembly for a polymer electrolyte fuel cell may be obtained by ordinary methods, for example, as follows. First, a uniform dispersion made of a liquid composition comprising a polymer electrolyte and a conductive carbon black powder having particles of a platinum catalyst or a platinum-alloy catalyst supported thereon, is obtained. Then, by any one of the following methods, a gas diffusion electrode is formed and a membrane/electrode assembly is obtained.

The first method is a method wherein both sides of the electrolyte membrane are coated with the above-mentioned dispersion followed by drying, and then two sheets of carbon cloth or carbon paper are bonded to both sides. The second method is a method wherein the above-mentioned dispersion is applied to two sheets of carbon cloth or carbon paper and dried, then the above-mentioned electrolyte membrane is thereby sandwiched from both sides so that the side coated with the dispersion is bonded to the above-mentioned electrolyte membrane. The third method is a method wherein the above-mentioned dispersion is applied to a separately prepared substrate film and dried to form a catalyst layer, then the catalyst layer is transferred to each side of an electrolyte membrane, and two sheets of carbon cloth or carbon paper are bonded to both sides. The carbon cloth or the carbon paper may have, on its surface, a layer made of e.g. a fluorinated resin to have water repellency. Further, in order to secure electrical conductivity, carbon, etc. may be contained in said layer.

The obtained membrane/electrode assembly is interposed between separators where grooves formed to constitute paths for a fuel gas or an oxidant gas, and is assembled into a cell to obtain a fuel cell. For example, in a polymer electrolyte fuel cell, a hydrogen gas is supplied to the anode side, and oxygen or air is supplied to the cathode side of the membrane/electrode assembly. The present electrolyte material is applicable not only to a hydrogen/oxygen type fuel cell, but also a direct methanol type fuel cell (DMFC). Methanol or an aqueous methanol solution used for DMFC fuel, may be fed as liquid or gas.

The operation temperature of the polymer electrolyte fuel cell is generally at most 80° C., but it is desired to set it at a level of at least 90° C. or at least 100° C. When the operation temperature is set to be at least 100° C., it will be possible to use exhaust heat of the cell more efficiently, and at the same time, heat removal will be easier, whereby the temperature control of the cell during the operation will be easier. Further, in this case, it is possible to decrease catalyst poisoning by e.g. carbon monoxide contained in a reactant gas of the anode. As a result, it is possible to improve the cell life and increase the cell output.

The present electrolyte material has a high softening temperature, with improved durability. Accordingly, when a polymer electrolyte membrane is made of the present electrolyte material, or when a polymer electrolyte contained in a catalyst layer of at least one of a cathode and an anode is the present electrolyte material, it is preferred to operate a cell at least at 90° C., more preferably at least at 100° C. Namely, during the cell operation, a deformation or a change with time of a physical property such as swelling degree of the polymer electrolyte material, is suppressed, so that the cell life is improved. The softening temperature of the present electrolyte material is preferably higher than the operation temperature, and is at least 100° C., more preferably at least 110° C., further preferably at least 120° C.

EXAMPLES

Now, the present invention will be described in further detail with reference to Examples, but it should be understood that the present invention is by no means restricted thereto.

Abbreviations employed are as follows.
HCFC 225cb: $CClF_2CF_2CHClF$
PSVE: $CF_2=CFOCF_2CF(CF_3)OCF_2CF_2SO_2F$
AIBN: $(CH_3)_2C(CN)N=NC(CH_3)_2(CN)$
IPP: $(CH_3)_2CHOC(=O)OOC(=O)OCH(CH_3)_2$
HCFC 141b: $CH_3CCl_2F$
TFE: $CF_2=CF_2$
PFBPO:

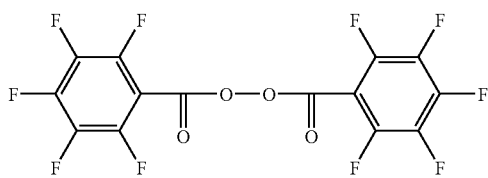

Measurements of the physical properties of a polymer were carried out as follows.

A TQ value was measured as an index for the molecular weight of a polymer. The TQ value (unit: ° C.) is a temperature at which the extrusion amount becomes 100 mm³/sec when melt extrusion of a polymer was carried out under a condition of an extrusion pressure of 2.94 MPa by using a nozzle having a length of 1 mm and an inner diameter of 1 mm. The extrusion amount was measured by changing the temperature by means of Flow Tester CFT-500A (manufactured by Shimadzu Corporation), and a TQ value at which the extrusion amount becomes 100 mm³/sec, was obtained.

The polymer composition was obtained by quantitatively analyzing the fluorosulfonyl group by an infrared absorption spectrum.

$A_R$ of a polymer was obtained as follows. With respect to a copolymer of TFE with the compound (m11), the polymer F12 was hydrolyzed by immersing it in a solution having a predetermined concentration of NaOH in a solvent of water/methanol, and $A_R$ was obtained by back titration of the solution. With respect to the other polymers of a copolymer of TFE with the compound (m11), it was obtained by comparing the absorption intensity of the fluorosulfonyl group in the infrared absorption spectrum with that of the polymer F4. With respect to a copolymer of TFE with the compound (m12), $A_R$ was obtained by hydrolysis/back titration of the polymer F16, and with respect to the other polymers, it was obtained by the infrared absorption spectrum. With respect to a copolymer of TFE with PSVE, $A_R$ was obtained by hydrolysis/back titration of the polymers F101 to 103.

Measurement of the softening temperature was carried out as follow. A polymer obtained by polymerization was pressed at a temperature in the vicinity of TQ to obtain a film. The film was subjected to alkali hydrolysis and then converted to an acid form polymer by acid treatment. By using a dynamic viscoelasticity measuring apparatus DVA200 (manufactured by ITK Co., LTD.), the dynamic viscoelasticity of the above-mentioned acid form film was measured with a sample width of 0.5 cm, and a length between chucks of 2 cm at a measurement frequency of 1 Hz at a temperature raising rate of 2° C./min and a temperature at which the storage modulus becomes one-half of the value at 50° C. was taken as the softening temperature.

The specific resistivity was measured by a known four terminal method by closely contacting a substrate having four terminal electrodes disposed at intervals of 5 mm to a film having a width of 5 mm under constant temperature and humidity conditions of 80° C. and 95% RH at an alternate current of 10 kHz at a voltage of 1 V.

Preparation Example for Compound (m11)

The compound (m11) was prepared by the following synthetic route. The details will be described below. The compound (s1) was prepared in the same manner as the method disclosed in JP-A-2002-528433 (Example 1).

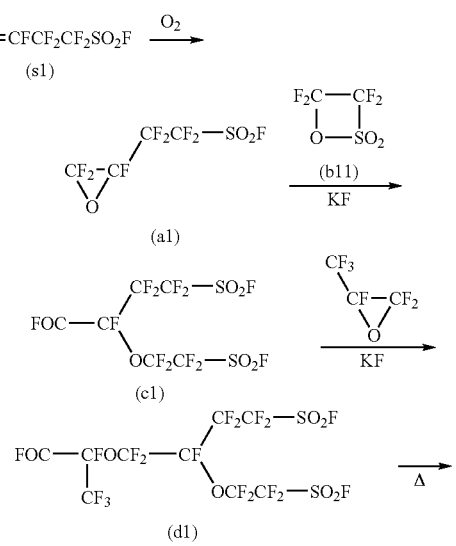

-continued

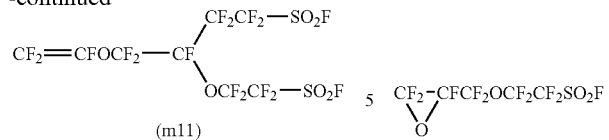
(m11)

(1) Preparation of Compound (a1)

In an autoclave (internal capacity: 200 cm³), the compound (s1) (300 g) was charged, and an oxidation reaction was carried out by bubbling oxygen gas while the internal temperature was maintained from 100° C. to 101.5° C., and then the following compound (a1) was obtained (yield: 260 g).

(2) Preparation of Compound (c1)

Into a 200 cm³ glass flask equipped with a stirrer, a dropping funnel and a Dimroth condenser, potassium fluoride (tradename: Chloro-catch F, manufactured by Morita Chemical Industries Co., Ltd.) (6.4 g) and monoglyme (51 g) were put and stirred, and while the internal temperature was cooled at from 5 to 10° C., from the dropping funnel, tetrafluoroethane-β-sultone (compound (b11)) (20 g) was dropwise added. After the dropwise addition, stirring was continued for 30 minutes, and then, from the dropping funnel, the compound (a1) (28 g) was dropwise added at from 10 to 20° C. After the dropwise addition, the mixture was stirred at 20° C. for 20 hours. After completion of the reaction, distillation under reduced pressure was carried out to obtain 43.2 g with a purity of 98% by gas chromatography (hereinafter referred to as GC).

(3) Preparation of Compound (d1)

Into a 200 cm³ stainless steel autoclave equipped with a stirrer and a pressure gauge, potassium fluoride (tradename: Chloro-catch F, manufactured by MORITA CHEMICAL INDUSTRIES Co., Ltd.) (1.2 g), monoglyme (9.6 g), the compound (c1) (92 g) were added and stirred at from 5 to 10° C. for one hour. Thereafter, under a pressure of at most 0.2 MPa (gauge pressure), hexafluoropropene oxide (33 g) was continuously added. By distillation, 86.6 g was obtained with a GC purity of 94%.

(4) Preparation of Compound (m11)

Using a stainless steel tube having an inner diameter of 1.6 cm, an U-tube having a length of 40 cm was prepared. In one side, a glass wool was packed, and in another side, glass beads were packed using a stainless steel sintered metal as a perforated plate, to form a fluidized-bed reactor. Using nitrogen gas as a fluidizing gas, the starting material was continuously supplied by using a metering pump. The outlet gas was collected by liquid nitrogen by means of a trap tube.

The above U-tube was put in a salt bath, and at the reaction temperature of 330° C., the compound (d1) (63 g) was supplied over a period of 3 hours. After completion of the reaction, by distilling the liquid in the liquid nitrogen trap, 25 g of the compound (m11) was obtained with a GC purity of 99%.

$^{19}$F-NMR of monomer (m11) (282.7 MHz, solvent: CDCl$_3$, standard: CFCl$_3$) δ (ppm): 46.3 (1F), 45.4 (1F), −79.1 (2F), −82.8 (2F), −106.7 (1F), −108.4 (1F), −112.3 (2F), −112.7 (dd, J=82.2 Hz, 66.9 Hz, 1F), −118.5 (2F), −121.3 (dd, J=112.7 Hz, 82.2 Hz, 1F), −136.2 (ddt, J=112.9 Hz, 67.1 Hz, 6.0 Hz, 1F), −140.2 (1F).

Preparation Example for Compound (m12)

The compound (m12) was prepared by the following synthetic route. The details will be described below. The compound (a2) was prepared in the same manner as the method disclosed in JP-A-57-176973 (Example 2).

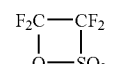
(a2)

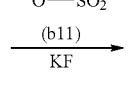
(b11)

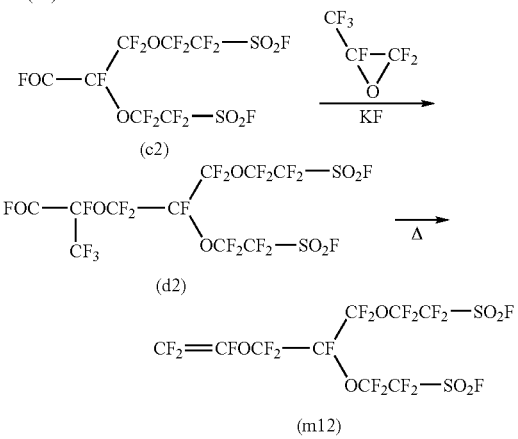

(1) Preparation of Compound (c2)

A 300 cm³ four-necked round bottom flask equipped with a Dimroth condenser, a thermometer, a dropping funnel and a stirring vane-attached glass rod, was prepared. In a nitrogen atmosphere, potassium fluoride (tradename: Chloro-catch F, manufactured by MORITA CHEMICAL INDUSTRIES Co., Ltd.) (1.6 g) and dimethoxy ethane (15.9 g) were added into the reactor.

Then, the reactor was cooled with an ice bath, and from the dropping funnel, tetrafluoroethane-β-sultone (compound b11)) 49.1 g was dropwise added over a period of 32 minutes at an internal temperature of at most 10° C. After completion of the dropwise addition, the compound (a2) (82.0 g) was dropwise added over a period of 15 minutes from the dropping funnel into the reactor. After completion of the dropwise addition, the temperature was returned to room temperature, and stirring was continued for about 90 hours. By a separatory funnel, the lower layer was recovered, and by distillation 97.7 g was obtained with a GC purity of 98%.

(2) Preparation of Compound (d2)

Into a stainless steel autoclave having an internal capacity of 200 cm³, potassium fluoride (tradename: Chloro-catch F, manufactured by MORITA CHEMICAL INDUSTRIES Co., Ltd.) (1.1 g) was added. After deaeration, under reduced pressure, dimethoxy ethane (5.3 g), acetonitrile (5.3 g) and the compound (c2) (95.8 g) were added. Then, the reactor was cooled with an ice bath, and at an internal temperature of from 0 to 5° C., hexafluoropropene oxide (27.2 g) was added over a period of 27 minutes, and then, the temperature was returned to room temperature with stirring, and the stirring was continued overnight. By a separatory funnel, the lower layer was recovered, and by distillation 72.0 g was obtained with a GC purity of 98%.

(3) Preparation of Compound (m12)

In the same manner as the preparation of the compound (m11), using the fluorized bed reaction apparatus, the compound (d2) (34.6 g) was supplied over a period of 1.5 hours at a reaction temperature of 340° C.

After completion of the reaction, by distillation of the liquid in the liquid nitrogen trap, the compound (m12) was obtained with a GC purity of 98%.

$^{19}$F-NMR of compound (m12) (282.7 MHz, solvent: CDCl$_3$, standard: CFCl$_3$) δ (ppm): 45.5 (1F), 45.2 (1F), −79.5 (2F), −82.4 (4F), −84.1 (2F), −112.4 (2F), −112.6 (2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), −144.9 (1F).

Preparation Example for Compound (m13)

The compound (c2) was prepared in the same manner as the synthetic route for the compound (m12), and then the compound (m13) was prepared from the compound (c2) as follows. The details will be described below.

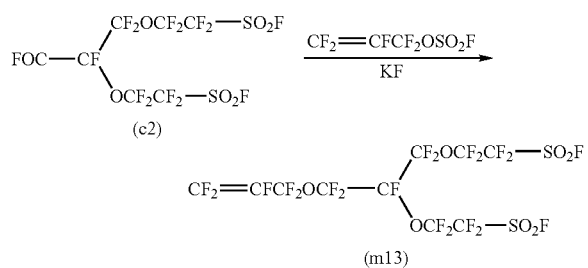

Into a 2,000 mL four-necked flask equipped with a thermometer, a Dimroth condenser and a stirrer, 677 g of diglyme was put in a nitrogen atmosphere. Then, with stirring, 23.33 g (402 mmol) of KF was added. A dropping funnel was attached to the reactor, and the reactor was cooled in an ice bath. 191.02 g (363 mmol) of compound (c2) was added dropwise over a period of 30 minutes. During this period, the internal temperature was from 2.7 to 6.4° C. Stirring was continued for 2 hours while the reactor was cooled in an ice bath.

Then, 88.55 g (385 mmol) of CF$_2$=CFOSO$_2$F was added dropwise from the dropping funnel over a period of 40 minutes. During this period, the internal temperature was from 0.9 to 3.4° C. Stirring was continued for 3 hours while the reactor was cooled in an ice bath, and stirring was further continued overnight at room temperature. The reaction liquid was subjected to filtration, and the lower layer of separated two phases was recovered to obtain 218 g (purity: 71.7%) of a crude product. Then, by distillation under reduced pressure, compound (m13) was obtained. Boiling point: 105 to 106° C./1.3 to 1.5 kPa. Isolation yield: 45%.

$^{19}$F-NMR of monomer (m13) (282.7 MHz, solvent: CDCl$_3$, standard: CFCl$_3$) δ (ppm): 45.5 (1F), 45.1 (1F), −72.1 (2F), −79.6 (2F), −82.4 (4F), −82.9 (2F), −90.3 (1F), −104.2 (1F), −112.5 (2F), −112.7 (2F), −145.2 (1F), −190.8 (1F).

Preparation Example 1 for Copolymer of TFE with the Compound (m11)

Into an autoclave (internal capacity: 100 cm$^3$, made of stainless steel), the compound (m11) (35.22 g), HCFC 225cb (28.78 g) and IPP (11.9 mg) were put, cooled by liquid nitrogen and deaerated. The internal temperature was raised to 40° C., and TFE was introduced into the autoclave to bring the pressure to 0.3 MPaG (gauge pressure). While the temperature and pressure were maintained to be constant, polymerization was carried out for 25.6 hours. Then, the interior of the autoclave was cooled to terminate the polymerization, and the gas in the system was purged.

The reaction solution was diluted with HCFC 225cb, and then HCFC 141b was added to flocculate the polymer, followed by filtration. Then, the polymer was stirred in HCFC 225cb and re-flocculated by HCFC 141b. Drying under reduced pressure at 80° C. was carried out overnight to obtain a polymer F11. The obtained amount was 12.2 g.

The content of units (m11) obtained by IR was 17.8 mol %. The TQ value was 237° C.

Preparation Example 2 for Copolymer of TFE with the Compound (m11)

TFE and the compound (m11) were copolymerized in the same manner as in Preparation Example 1 except that, respective conditions were changed as shown in Table 1, to obtain polymers F12 to F15. The polymerization results are shown in Table 1.

Preparation Example for Copolymer of TFE with the Compound (m12)

TFE and the compound (m12) were copolymerized in the same manner as in Preparation Example 1 for the above copolymer, except that respective conditions were changed as shown in Table 1, to obtain polymers F16 to F19. The polymerization results are shown in Table 2.

Preparation Example for Copolymer of TFE with the Compound (m13)

TFE and the compound (m13) were copolymerized in the same manner as in Preparation Example 1 for the above copolymer, except that respective conditions were changed as shown in Table 3, to obtain polymers F20 to F21. The polymerization results are shown in Table 3. Further, with respect to the copolymer of TFE with the compound of (m13), its ion exchange capacity was obtained by measuring the intensity of fluorescent X-rays of sulfur atoms (apparatus used: RIX3000 manufactured by Rigaku Corporation) with respect to a film having a thickness of from 100 to 200 μm prepared by hot pressing. A film of F101 was used as the standard sample.

TABLE 1

| | Obtained polymer | | | | |
|---|---|---|---|---|---|
| | F11 | F12 | F13 | F14 | F15 |
| Volume of reactor (cm$^3$) | 100 | 100 | 30 | 30 | 30 |
| Monomer(m11) (g) | 35.22 | 53.81 | 9.02 | 8.99 | 6.75 |
| HCFC 225cb (g) | 28.78 | 10.30 | 7.45 | 7.35 | 5.15 |
| Initiator | IPP | AIBN | IPP | IPP | AIBN |
| Amount of initiator (mg) | 11.9 | 6.5 | 7.8 | 7.7 | 3.4 |
| Polymerization temperature (° C.) | 40 | 67 | 40 | 40 | 70 |
| Pressure (MpaG) | 0.30 | 1.23 | 0.44 | 0.54 | 1.37 |
| Polymerization time (hrs) | 25.6 | 10.0 | 4.2 | 4.8 | 6.2 |
| Yield (g) | 12.2 | 11.4 | 1.4 | 3.0 | 5.1 |
| AR (meq · g$^{-1}$) | 1.96 | 1.86 | 1.70 | 1.51 | 1.06 |
| Unit(m11) (mol %) | 17.8 | 16.3 | 14.0 | 11.6 | 7.0 |
| TQ (° C.) | 237 | 237 | 270 | 310 | 351 |

TABLE 2

| | Obtained polymer | | | |
|---|---|---|---|---|
| | F16 | F17 | F18 | F19 |
| Volume of reactor (cm$^3$) | 30 | 30 | 30 | 30 |
| Monomer(m12) (g) | 9.84 | 8.51 | 8.16 | 9.43 |
| HCFC 225cb (g) | 3.09 | 4.03 | 4.21 | 4.85 |
| Initiator | AIBN | IPP | IPP | IPP |

TABLE 2-continued

| | Obtained polymer | | | |
|---|---|---|---|---|
| | F16 | F17 | F18 | F19 |
| Amount of initiator (mg) | 1.3 | 0.63 | 6.1 | 7.2 |
| Polymerization temperature (° C.) | 70 | 40 | 40 | 40 |
| Pressure (MpaG) | 1.31 | 0.57 | 0.63 | 0.71 |
| Polymerization time (hrs) | 5.7 | 10. 0 | 2.1 | 2.8 |
| Yield (g) | 1.2 | 0.98 | 0.80 | 2.1 |
| AR (meq · g$^{-1}$) | 1.63 | 1.29 | 1.13 | 0.86 |
| Unit(m12) (mol %) | 14.3 | 9.8 | 8.1 | 5.6 |
| TQ (° C.) | 225 | 320 | 270 | 279 |

TABLE 3

| | Obtained polymer | |
|---|---|---|
| | F20 | F21 |
| Volume of reactor (cm$^3$) | 30 | 30 |
| Monomer(m13) (g) | 24.92 | 25.08 |
| HCFC 225cb (g) | 0 | 0 |
| Initiator | PFBPO | PFBPO |
| Amount of initiator (mg) | 5.1 | 5.4 |
| Polymerization temperature (° C.) | 80 | 80 |
| Pressure (MpaG) | 0.25 | 0.14 |
| Polymerization time (hrs) | 8.5 | 9.0 |
| Yield (g) | 2.41 | 1.43 |
| $A_R$ (meq · g$^{-1}$) | 1.32 | 1.48 |
| Unit(m13) (mol %) | 10.7 | 12.9 |
| TQ (° C.) | 264 | 191 |

Examples 1 to 11

Conversion of Polymer to Acid Form and Property Evaluation as Electrolyte Material Polymers F11 to F21 were, respectively, treated by the following method to obtain films of acid-form polymers H11 to H21. First, polymer F15 was formed at a temperature of 320° C. and the other polymers were formed at the TQ temperature by press forming into the respective polymer films (film thickness: 100 to 200 µm). However, polymers F20 and F21 were heat-treated in air at 300° C. for 40 hours before the press forming. Then, in an aqueous solution containing 30 mass % of dimethyl sulfoxide and 15 mass % of KOH, the polymer films were immersed at 80° C. for 16 hours, whereby —SO$_2$F groups in the polymer films were hydrolyzed and converted to —SO$_3$K groups.

Further, the polymer films were immersed in a 3 mol/L aqueous hydrochloric acid solution at 50° C. for two hours, and then, the aqueous hydrochloric acid solution was changed to new one. Such acid treatment was repeated for four times. Then, the polymer films were thoroughly washed with deionized water to obtain polymer films wherein —SO$_3$K groups were converted to —SO$_3$H groups.

The softening temperatures and specific resistivities of the acid form polymers were measured. The results are shown in Tables 4 to 6. Further, the glass transition temperature (Tg) obtained from the peak value of tan δ in the measurement of the dynamic viscoelasticity is also shown.

TABLE 4

| | Examples | | | | |
|---|---|---|---|---|---|
| | Ex. 1 | Ex. 2 | Ex. 3 | Ex. 4 | Ex. 5 |
| Polymer used | F11 | F12 | F13 | F14 | F15 |
| Obtained polymer | H11 | H12 | H13 | H14 | H15 |
| Softening temperature (° C.) | 120 | 122 | 120 | 120 | 126 |
| Tg(tan δ) (° C.) | 146 | 150 | 150 | 150 | 150 |
| Specific resistivity (Ω · cm) | 1.4 | 1.7 | 1.9 | 2.1 | 4.3 |

TABLE 5

| | Examples | | | |
|---|---|---|---|---|
| | Ex. 6 | Ex. 7 | Ex. 8 | Ex. 9 |
| Polymer used | F16 | F17 | F18 | F19 |
| Obtained polymer | H16 | H17 | H18 | H19 |
| Softening temperature (° C.) | 109 | 110 | 116 | 125 |
| Tg(tan δ) (° C.) | 138 | 136 | 136 | 138 |
| Specific resistivity (Ω · cm) | 2.3 | 3.1 | 3.1 | 6.0 |

TABLE 6

| | Examples | |
|---|---|---|
| | Ex. 10 | Ex. 11 |
| Polymer used | F20 | F20 |
| Obtained polymer | H21 | H21 |
| Softening temperature (° C.) | 111 | 106 |
| Tg(tan δ) (° C.) | 134 | 138 |
| Specific resistivity (Ω · cm) | 3.0 | 2.3 |

Examples 12 to 14 (Comparative Examples)

TFE and PSVE were copolymerized to obtain polymers F101 to 103. They were further converted to acid-forms to obtain polymers H101 to 103. The physical properties of the respective polymers were measured, and the results are shown in Table 7.

TABLE 7

| | Examples | | |
|---|---|---|---|
| | Ex. 12 | Ex. 13 | Ex. 14 |
| Obtained polymer | H101 | H102 | H103 |
| AR (meq · g$^{-1}$) | 1.10 | 1.00 | 0.91 |
| Comonomer (mol %) | 17.8 | 15.3 | 13.3 |
| TQ (° C.) | 225 | 220 | 220 |
| Softening temperature (° C.) | 76 | 82 | 85 |
| Tg(tan δ) (° C.) | 109 | 110 | 112 |
| Specific resistivity (Ω · cm) | 3.6 | 4.8 | 6.6 |

FIG. 1 shows the relation between the temperature and the storage modulus obtained by carrying out a dynamic viscoelasticity measurement by using films of the polymer H11 obtained by copolymerizing TFE and the compound (m11), followed by conversion to an acid-form and the polymer H16 obtained by copolymerizing TFE and the compound (m12), followed by conversion to an acid-form. For the purpose of comparison, that of the polymer H101 obtained by copolymerizing TFE and PSVE, followed by conversion to an acid-form, is also shown. It is evident that as compared with the conventional polymer obtained by copolymerizing TFE and PSVE, followed by conversion to an acid-form, with respect to the polymer obtained by copolymerizing the compound (m11) or (m12) and TFE, followed by conversion to an acid-form, the softening temperature and the glass transition temperature are high.

Figure 2:
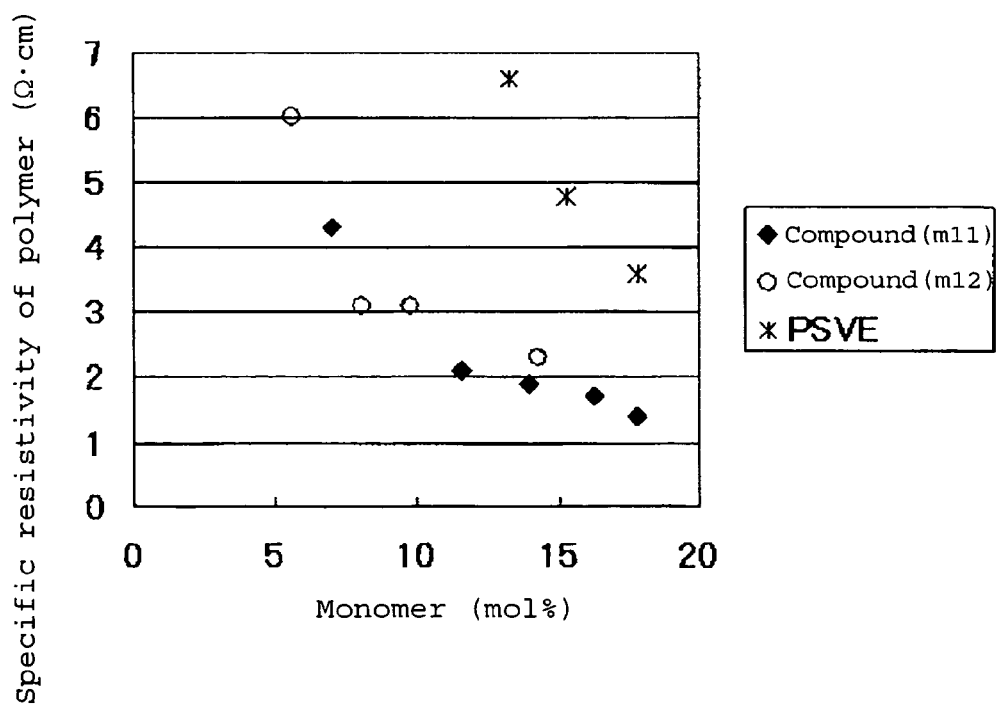
FIG. 2 is a graph showing a relation between the monomer composition and the specific resistivity of the polymer.

FIG. 2 shows the relation between the specific resistivity of an acid-form polymer and the content (mol %) of the compound (m11), the compound (m12), or PSVE in the polymer. It is evident that with the polymer obtained by copolymerizing the compound (m11) or (m12) having two fluorosulfonyl groups, and TFE, followed by conversion to an acid-form, the resistance is lower, even if the monomer content is small, than that of the conventional polymer obtained by copolymerizing PSVE and TFE. As the content of the vinyl ether monomer is lower and the TFE content is higher, the mechanical strength becomes higher. Accordingly, it is evident that when the compound (m11) or (m12) is used, it is possible to obtain an acid-form polymer having a low resistance and high strength as compared with a case where PSVE is used.

Example 15

The polymer converted to an acid-form obtained in Example 4 was dispersed in a solvent mixture of ethanol and water (70/30 mass ratio), to obtain a dispersion having a solid content of 9% by mass ratio. This dispersion is designated as dispersion A. Then, the dispersion A was applied to a 100 μm sheet made of an ethylene/tetrafluoroethylene copolymer (tradename: AFLEX 100N, manufactured by ASAHI GLASS CO., LTD., hereinafter referred to simply as ETFE sheet), by a die coater to form a film, and it was dried at 80° C. for 30 minutes and was annealed at 190° C. for 30 minutes to form an ion exchange membrane having a thickness of 25 μm.

Then, 126 g of water was added to 20 g of a catalyst having 50 mass % of platinum supported on carbon black powder, and the ultrasonic waves were applied for 10 minutes to disperse it uniformly. 80 g of the dispersion A was added thereto, and 54 g of ethanol was further added thereto, to make the solid content concentration to be 10%, thereby to obtain a coating liquid for preparation of a catalyst layer. This coating liquid was applied to separately prepared ETFE sheets, and dried to obtain two catalyst layers having a platinum content of 0.2 mg/cm$^2$.

The previously obtained ion exchange membrane was sandwiched from both sides by the above-mentioned two catalyst layers, followed by hot-pressing (pressing condition: 150° C., 5 minutes, 3 MPa) to bond the catalyst layers to both sides of the membrane, and then substrate films were removed to obtain a membrane/catalyst layer assembly having an electrode area of 25 cm$^2$.

This membrane/catalyst layer assembly was sandwiched by two gas diffusion layers made of carbon paper to obtain a membrane/electrode assembly. The carbon paper used here had a layer made of carbon and polytetrafluoroethylene on one side and is disposed so that the layer was in contact with the catalyst layer of the membrane/catalyst layer assembly. This membrane/electrode assembly was assembled into a cell for power generation, and at a cell temperature 80° C., hydrogen (utilization: 70%) and air (utilization: 50%) were supplied to the anode and to the cathode, respectively, at a normal pressure. In such case, cell voltages at current densities of 0.5 and 1.0 A/cm$^2$, were recorded when the dew point of humidified gas was set at 80° C. for both hydrogen and air, and when it was set at 44° C. to make it lower humidified condition respectively. The results are shown in Table 6.

Example 16

The polymer converted to an acid-form obtained in Example 6 was dispersed in a solvent mixture of ethanol, water and isopropanol (25/65/10 mass ratio) to obtain a dispersion having a solid content of 10 mass %. This dispersion is designated as dispersion B. Then, in the same manner as in Example 15, by using the dispersion B, an ion exchange membrane and a catalyst layer were prepared, and then a membrane/electrode assembly was obtained. This membrane/electrode assembly was evaluated in the same manner as Example 15. The results are shown in Table 8.

Example 17

The polymer converted to an acid-form obtained in Example 10 was dispersed in a solvent mixture of ethanol and water (70/30 mass content) to obtain a dispersion having a solid content of 10 mass %. This dispersion is designated as dispersion C. Then, in the same manner as Example 15, by using the dispersion C, an ion exchange membrane and a catalyst layer were prepared, and then a membrane/electrode assembly was obtained. This membrane/electrode assembly was evaluated in the same manner as Example 15. The results are shown in Table 8.

TABLE 8

| | Dew point of humidified gas 80° C. | | Dew point of humidified gas 44° C. | |
| --- | --- | --- | --- | --- |
| | 0.5 A/cm$^2$ | 1.0 A/cm$^2$ | 0.5 A/cm$^2$ | 1.0 A/cm$^2$ |
| Ex. 13 | 0.65 V | 0.53 V | 0.56 V | 0.38 V |
| Ex. 14 | 0.70 V | 0.55 V | 0.56 V | 0.38 V |
| Ex. 15 | 0.65 V | 0.46 V | 0.49 V | No power generation |

INDUSTRIAL APPLICABILITY

The electrolyte material for polymer electrolyte fuel cells of the present invention has a high ion exchange capacity resulting in a low electric resistance, and a high softening temperature, excellent mechanical strength, which provides a durable membrane/electrode assembly for polymer electrolyte fuel cells. When the electric resistance of the electrolyte material becomes low, the electric power generation performance will be excellent particularly even under a low humidity environment, and e.g. a humidifier may be simplified or may not be used. Further, as the softening temperature of the electrolyte material is high, it will be possible to operate the cell at a higher temperature than before, and it will be possible to obtain a merit such that a radiator may be made smaller and the output may be increased by lowering catalyst poisoning by a trace amount of carbon monoxide contained in the reformed hydrogen gas.

The entire disclosures of Japanese Patent Application No. 2005-217110 filed on Jul. 27, 2005, Japanese Patent Application No. 2005-230826 filed on Aug. 9, 2005 and Japanese Patent Application No. 2006-001500 filed on Jan. 6, 2006 including specifications, claims, drawings and summaries are incorporated herein by reference in their entirety.

What is claimed is:

1. An electrolyte material for polymer electrolyte fuel cells, which is made of a polymer containing repeating units based on a fluoromonomer having a radical polymerization reactivity, wherein the repeating units contain, in their side chains, a structure of the following formula (α) having ionic groups:

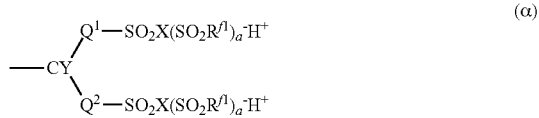

provided that the symbols in the formula have the following meanings:

Each of $Q^1$ and $Q^2$ which are independent of each other, is a $C_{1-6}$ perfluoroalkylene group which may have an etheric oxygen atom and at least one of perfluoroalkylene groups for $Q^1$ and $Q^2$ has an etheric oxygen atom, $R^{f1}$ is a perfluoroalkyl group which may have an etheric oxygen atom, and X is an oxygen atom, a nitrogen atom or a carbon atom, provided that when X is an oxygen atom, a=0, when X is a nitrogen atom, a=1, and when X is a carbon atom, a=2, and Y is a fluorine atom or a monovalent perfluoro organic group.

2. The electrolyte material for polymer electrolyte fuel cells according to claim 1, wherein the repeating units are repeating units shown in the following formula (U1):

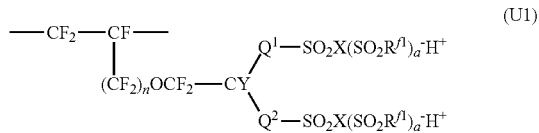

provided that the symbols in the formula have the following meanings:

$Q^1$, $Q^2$, $R^{f1}$, a, X and Y are as defined as above, and n is 0 or 1.

3. The electrolyte material for polymer electrolyte fuel cells according to claim 1, wherein one of $Q^1$ and $Q^2$ has an etheric oxygen atom.

4. The electrolyte material for polymer electrolyte fuel cells according to claim 1, wherein $Q^1$ and $Q^2$ have an etheric oxygen atom.

5. The electrolyte material for polymer electrolyte fuel cells according to claim 1, wherein the polymer is a perfluoropolymer.

6. The electrolyte material for polymer electrolyte fuel cells according to claim 1, wherein the polymer is a copolymer containing repeating units based on tetrafluoroethylene.

7. The electrolyte material for polymer electrolyte fuel cells according to claim 2, wherein one of $Q^1$ and $Q^2$ has an etheric oxygen atom.

8. The electrolyte material for polymer electrolyte fuel cells according to claim 2, wherein $Q^1$ and $Q^2$ have an etheric oxygen atom.

9. The electrolyte material for polymer electrolyte fuel cells according to claim 2, wherein the polymer is a perfluoropolymer.

10. The electrolyte material for polymer electrolyte fuel cells according to claim 2, wherein the polymer is a copolymer containing repeating units based on tetrafluoroethylene.

11. An electrolyte membrane for polymer electrolyte fuel cells, which is made of the electrolyte material as defined in claim 1.

12. A membrane/electrode assembly for polymer electrolyte fuel cells, which comprises a cathode and an anode each having a catalyst layer containing a catalyst and a polymer electrolyte, and a polymer electrolyte membrane interposed between the cathode and the anode, wherein the polymer electrolyte membrane is the electrolyte membrane as defined in claim 11.

13. A membrane/electrode assembly for polymer electrolyte fuel cells, which comprises a cathode and an anode each having a catalyst layer containing a catalyst and a polymer electrolyte, and a polymer electrolyte membrane interposed between the cathode and the anode, wherein the polymer electrolyte contained in at least one of the catalyst layers of the cathode and the anode, is the electrolyte material as defined in claim 1.

14. An electrolyte membrane for polymer electrolyte fuel cells, which is made of the electrolyte material as defined in claim 2.

15. A membrane/electrode assembly for polymer electrolyte fuel cells, which comprises a cathode and an anode each having a catalyst layer containing a catalyst and a polymer electrolyte, and a polymer electrolyte membrane interposed between the cathode and the anode, wherein the polymer electrolyte membrane is the electrolyte membrane as defined in claim 14.

16. A membrane/electrode assembly for polymer electrolyte fuel cells, which comprises a cathode and an anode each having a catalyst layer containing a catalyst and a polymer electrolyte, and a polymer electrolyte membrane interposed between the cathode and the anode, wherein the polymer electrolyte contained in at least one of the catalyst layers of the cathode and the anode, is the electrolyte material as defined in claim 2.

17. An electrolyte membrane for polymer electrolyte fuel cells, which is made of the electrolyte material as defined in claim 4.

18. A membrane/electrode assembly for polymer electrolyte fuel cells, which comprises a cathode and an anode each having a catalyst layer containing a catalyst and a polymer electrolyte, and a polymer electrolyte membrane interposed between the cathode and the anode, wherein the polymer electrolyte membrane is the electrolyte membrane as defined in claim 17.

19. A membrane/electrode assembly for polymer electrolyte fuel cells, which comprises a cathode and an anode each having a catalyst layer containing a catalyst and a polymer electrolyte, and a polymer electrolyte membrane interposed between the cathode and the anode, wherein the polymer electrolyte contained in at least one of the catalyst layers of the cathode and the anode, is the electrolyte material as defined in claim 4.

* * * * *